United States Patent [19]

Watson

[11] 3,993,711

[45] Nov. 23, 1976

[54] CARBOXYLATED POLY(ARYLACETYLENES)

[75] Inventor: Aron S. Watson, New Castle, Del.

[73] Assignee: Hercules Incorporated, Wilmington, Del.

[22] Filed: Mar. 19, 1975

[21] Appl. No.: 559,867

[52] U.S. Cl. ............................... 260/874; 526/19; 526/285
[51] Int. Cl.² ................ C08F 38/00; C08F 138/00; C08F 238/00
[58] Field of Search ........... 260/874, 94.1; 526/285, 526/19

[56] References Cited
UNITED STATES PATENTS 3,705,131  12/1972  Korshak et al. ................ 260/47 UA

FOREIGN PATENTS OR APPLICATIONS 971,170  9/1964  United Kingdom ................ 260/94.1
394,392  8/1973  U.S.S.R.

*Primary Examiner*—William F. Hamrock
*Attorney, Agent, or Firm*—John W. Whitson

[57] ABSTRACT

The invention relates to poly (arylacetylenes) which have been modified by oxidation to introduce carboxyl functionality into the polymer molecule. Representative of the poly (arylacetylenes) is the polymer prepared by aromatization of diethynylbenzene. The carboxylated polymers produced from these poly (arylacetylenes) are useful as coupling agents to improve the adhesion of the parent polymers to metal surfaces and inorganic substrates.

4 Claims, No Drawings

CARBOXYLATED POLY(ARYLACETYLENES)

This invention relates to carboxyl-modified arylacetylene polymers and more particularly to such polymers derived from polyacetylenically substituted aromatic compounds. The modified polymers are useful as coupling agents to improve the adhesion of their unmodified polymer counterparts to metal surfaces and inorganic substrates.

A new class of arylacetylene polymers and thermosetting compositions containing them are described in the copending application of Harold Jabloner, Ser. No. 262,166, filed June 12, 1972. The thermosetting compositions of the Jabloner application have excellent melt flow properties and can be thermoformed and cured without gas evolution. On being cured, the compositions provide thermoset resins having excellent thermal stability. However, in certain end use applications, such as in corrosion resistant coatings and in particulate filled systems which are subject to thermal and mechanical abuse, the resins require improvement in adhesive action.

Now, in accordance with the invention, it has been found that the Jabloner polymers may be modified by oxidation to introduce carboxyl functionality into the polymer molecule and that the carboxylated polymer markedly improves the adhesion of the unmodified polymer to metal and inorganic substrates, including particulate materials. The carboxylated polymer of this invention is derived from at least one polyacetylenically substituted aromatic compound, and the polymer is characterized by having a number average molecular weight of from about 900 to about 12,000, a ratio of aromatic protons to olefinic protons greater than about 2.4, from about 5 to about 20% by weight of terminal acetylenic groups and from about 0.1 to about 5% by weight of carboxyl groups.

PREPARATION OF THE POLYMER

The first step in the preparation of the carboxylated polymer of this invention is the formation of a prepolymer, in accordance with the Jabloner application, from at least one polyacetylenically substituted aromatic compound, which prepolymer is subsequently oxidized in a second step with a conventional oxidizing agent such as potassium permagnanate to effect conversion of some of the terminal acetylenic groups of the prepolymer to carboxyl groups. The polyacetylenically substituted aromatic compound used to prepare the prepolymer can be any aromatic compound containing two or more acetylene groups, i.e., two carbons linked by a triple bond, attached to the same aromatic ring or to different aromatic rings in the compound, or mixtures of such compounds. The acetylenic groups can be internal, i.e., acetylene groups of the type aryl-C≡C-aryl, or they can be external, i.e., ethynyl groups of the type aryl-C≡C-H, or both types can be present in the polyacetylenic compound. These compounds containing at least one external acetylenic group are preferred, since these are the most reactive. Generally, those compounds containing only internal acetylenic groups are used in admixture with a compound containing at least two terminal ethynyl groups.

Exemplary of the polyacetylenically substituted aromatic compounds are m- and p-diethynylbenzenes; diethynyl toluenes; diethynyl xylenes; 9,10-diethynylanthracene; diethynylbiphenyl; 9,10-diethynylphenanthrene; 4,4'-diethynyl-trans-azobenzene; di(ethynylphenyl)ether; 2,3,5,6-tetrachloro-1,4-diethynylbenzene; diphenyl-diacetylene(i.e., diphenylbutadiyne); dibenzyl-diacetylene; di-p-tolyldiacetylene; di-alpha-naphthyldiacetylene; 1-chloro-2,5-diethynylbenzene; 2,2'-dichlorodiphenyldiacetylene; 4,4'-dichlorodiphenyldiacetylene; 4,4'-dibromodiphenyldiacetylene; 1,4-bis-(phenylethynyl)benzene; 1,3-bis(phenylethynyl)benzene; 9,10-bis-(phenylethynyl)anthracene; 1,3,5-triethynylbenzene; 1,2,4-triethynylbenzene; 1,3,5-tris(phenylethynyl)-2,4,6-triphenylbenzene; 1,2,4-tris(phenylethynyl)-3,5,6-triphenylbenzene; and tris(ethynylphenyl)benzene.

Monoacetylenically substituted aromatic compounds such as, for example, phenylacetylene, biphenylacetylene and diphenylacetylene, may be used in admixture with the polyacetylenically substituted aromatic compound in the preparation of the prepolymers. Representative of such an admixture of monoacetylenic and polyacetylenic compounds is that of diethynylbenzene with phenylacetylene. The diethynylbenzene component may be m-diethynylbenzene, p-diethynylbenzene or mixtures thereof. The phenylacetylene component enters the copolymer at approximately one-half the rate of the diethynylbenzene component. Thus, considerable variation in the composition of the reaction mixture is possible in producing copolymers containing from about 10 to about 45% by weight of phenylacetylene-derived units.

The prepolymerization reaction is carried out by heating the polyacetylenically substituted aromatic compound with an aromatization catalyst. The polyacetylenic monomer, or mixtures of monomers, is heated with the catalyst to a temperature of from about 55° C. to about 250° C., and more preferably from about 80° C. to about 150° C. The reaction is preferably carried out in an inert atmosphere. The reaction can be carried out in bulk or in the presence of an inert diluent. Any inert diluent can be used, as, for example, ethers such as 1,2-dimethoxyethane, dioxane and tetrahyrofuran, ketones such as acetone, and aromatic hydrocarbons such as benzene, toluene and xylene. The amount of diluent used is not critical and generally will be such as to form a concentration of the polyacetylenically substituted aromatic compound in the diluent of from about 2 to about 50%.

Any aromatization catalyst can be used to effect the desired cyclization reaction. As is well known in the art, an aromatization catalyst is one which promotes the formation of an aromatic ring by the cyclization of three acetylene groups. Thus, the reaction is one of polycyclotrimerization. Preferred aromatization catalysts are nickel complexes, such as nickel bis(acrylonitrile), nickel bis(acraldehyde), nickel carbonyl bis(triphenylphosphine), nickel cyanide bis(triphenylphosphine) and nickel acetylacetonate in combination with triphenylphosphine; the Group IV-B metal halides, such as titanium tetrachloride in combination with diethylaluminum chloride; and the Group V-B metal halides, such as the niobium and tantalum pentahalides. The amount of the catalyst used can be varied widely but generally will be from about 0.5 to about 5% of the monomer by weight.

In carrying out the process it is essential to stop the reaction prior to complete conversion of the monomer. If the reaction is allowed to go to completion, the product is an insoluble, infusible material that cannot be plastic formed, nor can it be fluidized with a fluidizer and then plastic formed. Hence, the reaction is generally stopped at a monomer conversion above about 30% and below about 90%, and preferably at a monomer conversion of from about 50% to about 90%. By so doing, it is possible to produce a prepolymer having a number average molecular weight of from about 900 to about 12,000, avoid the production of very high molecular weight materials which are of essentially no use in the production of plastic formed articles, and retain in the prepolymer at least about 5%, and preferably about 5 to 20%, by weight of terminal acetylene groups, which then are available for reaction in the curing of thermosetting compositions containing the prepolymer. The prepolymers are soluble in aromatic hydrocarbons, ketones and ethers.

The method by which the prepolymerization reaction is stopped and the prepolymer is isolated will, of course, depend in large measure on the method used in preparing the prepolymer and on the monomer or monomers used in its preparation. If a monomer of comparatively high volatility is used in the preparation of the prepolymer, then any of such monomer remaining in the prepolymer should be removed to avoid foaming and void formation in the plastic forming and curing steps used in the preparation of thermoset resins based on the prepolymer. This removal can be effected by vacuum evaporation or steam distillation of the prepolymerization reaction mixture, or the reaction mixture can be mixed with a diluent which is a solvent for the monomer and a nonsolvent for the prepolymer. In the latter case, the prepolymer can be separated, as for example, by filtration, and the monomer, any prepolymer remaining in solution, and the diluents can be recovered and recycled in the process. Suitable diluents for precipitating the prepolymer are alcohols such as methanol, ethanol and isopropanol, and aliphatic hydrocarbons or mixtures thereof such as petroleum ether, pentane, hexane and heptane.

The foregoing prepolymers are unique polymers, and are described and claimed in the aforementioned Jabloner application. It is well known that acetylene and substituted acetylenes, as for example, phenylacetylene, can be polymerized, but the polymers so produced are predominantly linear polymers which have appreciable olefinic or acetylenic unsaturation in the polymer chain. It is also known that aliphatic compounds containing two or more acetylenic groups can be polymerized, but again the polymer is linear and contains acetylenic unsaturation in the polymer chain. However, the instant prepolymers, prepared from a polyacetylene compound with an aromatization catalyst, differ from the prior art acetylene polymers in that they are predominantly non-linear in structure, at least 50% of the acetylenic unsaturation of the monomer having been converted during polymerization into aromatic structures. Furthermore, the unsaturation remaining in the prepolymer is chiefly acetylenic, and the prepolymer has only a low degree of olefinic unsaturation. The acetylenic content of the prepolymer will preferably be from about 5% to about 20% by weight of the prepolymer. The low degree of olefinic unsaturation is important since the presence of a significant amount of such unsaturation can lead to high temperature thermal and oxidative instability of thermoset resins prepared in accordance with this invention. The formation of aromatic structures during preparation of the prepolymer contributes oxidation resistant and stable linkages.

The olefinic unsaturation of the prepolymer can be determined by a nuclear magnetic resonance method in which the number of hydrogen atoms attached to olefinic carbons, such hydrogens hereafter being referred to as olefinic protons, is compared with the number of hydrogen atoms attached to aromatic rings, such hydrogens hereafter being referred to as aromatic protons. The amount of acetylenic unsaturation can be determined by a similar technique comparing the ratio of hydrogens attached to acetylenic carbons, such hyrogens hereafter being referred to as acetylenic protons, with the aromatic protons. The prepolymer, to be useful in the preparation of thermoset resins, will have a ratio of aromatic protons to olefinic protons greater than about 2.4:1 and preferably greater than about 7.5:1.

In determining ratio of acetylenic, aromatic and olefinic protons present in the prepolymer by the nuclear magnetic resonance method, deuterated acetone is used as a solvent. The areas under the peaks near 3.63 ppm., the peak at 7.48 ppm., and under the curve between 6.83 and 5.4 ppm. are proportional to the number of acetylenic, aromatic and olefinic protons, chemical shift values being measured versus an internal tetramethylsilane reference. The amount of acetylenic protons, and so the acetylene group concentration, is determined quantitatively by use of an internal standard, nitromethane, added in accurate proportion to the prepolymer and giving a signal peak at 4.42 ppm.

The above-described prepolymers are the materials used in preparing the carboxyl-modified arylacetylene polymers of this invention. The prepolymers are subjected to the action of an oxidizing agent capable of converting at least some of the terminal acetylenic unsaturation of the prepolymer into carboxyl groups, thus introducing carboxyl functionality into the polymer molecule. Suitable oxidizing agents are potassium permanganate, chromic acid, ozone and thallic nitrateperchloric acid. The extent of oxidation may be governed by the amount of oxidizing agent used.

The oxidation ordinarily is carried out at a temperature in the range of about 15° to about 45° C. in a homogeneous solution of the prepolymer and oxidizing agent, and satisfactory solvents for this purpose are acetone, dioxane, tetrahydrofuran, ethylene glycol dimethyl ether, and diethyleneglycol diethyl ether. The oxidized prepolymer may be isolated from the reaction mixture by precipitation with a diluent such as methanol, ethanol, isopropanol, pentane, hexane, heptane and petroleum ether.

The carboxylated polymers produced by the foregoing oxidation reaction are characterized by having a number average molecular weight of from about 900 to about 12,000 and a ratio of aromatic protons to olefinic protons greater than about 2.4 to 1, and by containing from about 5 to about 20% by weight of terminal acetylenic groups and from about 0.1 to about 5% by weight of carboxyl groups. It is this carboxyl functionality of the polymers of this invention, plus their compatibility with their prepolymer counterparts, which render them so useful as coupling agents in improving the adhesion of the prepolymer counterparts to metal surfaces and inorganic substrates. Advantageously, the two types of polymers also have similar rheological and curing properties.

UTILIZATION OF CARBOXYLATED POLYMER

The carboxylated polymers of this invention are desirably used in admixture with the prepolymers from which they are derived as thermosetting compositions wherein the carboxylated polymer component improves the adhesion of the thermosetting composition to metal and inorganic substrates. The amount of carboxylated polymer in the composition may be varied from about 2% to about 25%, but will generally be from about 5% to about 10% by weight of the composition. However, both the above-described prepolymers and the carboxylated polymers of this invention have high softening points and, insofar as many thermoforming techniques are concerned, the thermosetting compositions containing them may not have the flow properties required for plastic forming at tempertures below the cure temperature for these compositions. Therefore, it ordinarily is desirable to include a fluidizer for the polymer components in the thermosetting composition, thereby making it possible to produce a composition which will have sufficient flow to permit plastic forming and that, when further heated after plastic forming, will cure to produce a thermoset resin having improved adhesive properties.

The preferred type of fluidizer used in accordance with this invention is that represented by the acetylenic fluidizers disclosed in the aforementioned Jabloner application. These fluidizers are acetylenically substituted (mono- or poly-) aromatic compounds having a melting point below about 185° C. and a boiling point above about 250° C. Representative of such acetylenic fluidizers are beta-naphthylacetylene, biphenylacetylene, 4-ethynyltrans-azobenzene, diphenylacetylene, di-m-tolylacetylene, di-o-tolylacetylene, bis(4-ethylphenyl)acetylene, bis(3,4-dimethylphenyl)acetylene, bis(4-chlorophenyl)acetylene, phenyl benzoyl acetylene, beta-naphthylphenylacetylene, di(alpha-napthyl) acetylene, 1,4-diethynylnaphthalene, 9,10-diethynylanthracene, 4,4'-diethynylbiphenyl, 9,10-diethynylphenanthrene 4,4'-diethynyl-trans-azobenzene 4,4'-diethynyldiphenyl ether, 2,3,5,6-tetrachloro-1,4-diethynylbenzene, diphenylbutadiyne, di-p-tolyldiacetylene, dibenzyl-diacetylene, 2,2'-dichlorodiphenyl diacetylene, 3,3'-dichlorodiphenyl diacetylene, di(alpha-naphthyl)-diacetylene, diethynyldiphenyl butadiyne and tris(ethynylphenyl)-benzene. These fluidizer compounds may be used either individually or in admixture with each other.

Just how the acetylenic fluidizer compound acts on the polymer components of the thermosetting composition to produce a plastic formable composition is not completely known. It is believed that in part it acts as a plasticizer, making it possible to shape the polymer admixture, and in part that it undergoes a partial reaction with the polymer components thereof. In any event, such acetylenic fluidizers, unlike ordinary plasticizers, react with the polymer components when the plastic formed composition is cured and hence become a part of the final thermoset resin. The amount of acetylenic fluidizer incorporated in the thermosetting composition can be varied over a wide range, but generally will be from about 2% to about 70% by weight of the polymer components of the composition, and preferably from about 5% to about 40%.

The fluidizer can be incorporated in the thermosetting composition in a variety of ways. One of the simplest methods is to mix the polymer components and fluidizer in a diluent that is a solvent for all three components and which is preferably low boiling for ease in removing the diluent from the resulting solvent solution after the mixing operation has been completed. Suitable diluents for preparation of the desired solvent solutions are methylene chloride, dichloroethane, acetone, methyl ethyl ketone, benzene and toluene. Such diluents can be removed, after adequate mixing has been achieved, by evaporation or distillation. The mixing operation can be carried out at any convenient temperature, generally at room temperature. Moreover, if the monomer or monomers used for the preparation of the prepolymer component of the thermosetting composition have boiling points above about 250° C., the unreacted portion does not need to be removed from the prepolymer and can act as all or part of the fluidizer in the thermosetting composition.

There can also be incorporated in the thermosetting composition fillers, pigments, antioxidants and other desired additives. Such additives are readily incorporated at the time the other components of the thermosetting composition are combined with each other. Exemplary of the materials that can be incorporated are organic and inorganic fibrous materials such as graphite, glass, asbestos, metal, metal oxide, metal carbide, boron, boron carbide, boron nitride and silicon carbide fibers, and particulate reinforcements such as glass beads, metal oxides, metal carbonates, clay, talc, silica, diatomaceous earth, carbon, graphite, molybdenum sulfide and powdered florocarbon resins. The amount of filler incorporated in the thermosetting composition can be varied widely, but generally will be from about 1 to about 95 percent by weight of the filled composition.

After effecting mixing of the components, the compositions so obtained can be divided by any desired means into suitable size pieces for subsequent fabrication operations. Alternatively, the compositions can be ground to fine powders and converted into pellets convenient for utilization in subsequent operations by compacting under pressure at room temperature or at a somewhat elevated temperature. These thermosetting compositions are stable and can be stored at room temperature.

The fluidized thermosetting compositions of this invention will flow on heating and remain sufficiently fluid so that the compositions can be shaped by conventional plastic forming such as extrusion, compression, transfer and injection molding, calendering and forging. Thus, shapes such as sheets, pipes, rods and wire coatings can be made by extrusion. Sheets can in subsequent operations be further modified in form as by embossing or thermoforming. More complex shapes can be made by molding operations. The temperature employed in the plastic forming and related operations can be varied widely, the preferred temperature being dependent on the amount of fluidizer when one is employed, the molecular weights of the polymer components, the type and amount of any filler or reinforcing agent present, the fabrication method, the pressure employed, and the amount of curing desired during the fabrication operation. Temperatures as low as about 40° C. can be used, or as high as 200° C., but generally will be within the range of from about 90° C. to about 165° C. As the heating continues above about 90° C., and generally at a pressure of from about 15 to about 15,000 p.s.i., the thermosetting composition resolidifies. In an operation such as extrusion, in which it may be desirable to recycle scrap material, low temperatures are employed to avoid much change in the flow properties of the composition during its fabrication. In other operations such as transfer or compression molding, it may be desirable to fabricate the material at an elevated temperature so that curing of the material occurs during the shaping operation.

The temperature at which the thermosetting composition is heated to effect further polymerization which can be referred to as the curing operation, can be varied widely and will depend on such factors as the components of the thermosetting composition and the size and shape of the fabricated article. In general, the conditions for effecting the cure will range from several hours at a temperature of about 100° C. to a few minutes at a temperature of about 300° C. Alternatively, a fabricated article can be used in its only partially cured form, and curing can be effected during use at an elevated temperature.

The reaction that takes place during the curing of the thermosetting composition containing an acetylenic fluidizer involves a copolymerization reaction between the acetylenic fluidizer and each of the polymer components, which reaction may effect some cross-linking of the polymer components. Thus, the final thermoset resin can be defined as containing copolymers of each of the polymer components and the acetylenic fluidizer. In the case of a thermosetting composition containing no acetylenic fluidizer, the reaction during curing is primarily one of further polymerization of the polymers.

The thermoset resins so produced are hard, stiff, strong, abrasion resistant, infusible and insoluble. They retain strength, stiffness and insolubility at elevated temperatures, are stable to exposure at elevated temperatures for extended periods, and are resistant to oxidative attack at elevated temperature. Their oxidative stability can be further enhanced by incorporation of inorganic stabilizers such as ammonium biphosphate and calcium hypophosphite. They are resistant to chemical attack by strong acids and concentrated alkali and are resistant to swelling by organic solvents at elevated temperatures. These thermoset resins are characterized by having a flexural strength of at least about 3000 p.s.i. and a flexural modulus of at least about 300,000 p.s.i. (ASTM No. D-790-70). The resins also are characterized by retaining at least about 50% of said flexural modulus in air up to a temperature of at least about 250° C., retaining at least about 90% of their weight when a 30 mil thick sheet is aged in air at 260° C. for 350 hours and losing less than about 15% of their weight when a 30 mil thick sheet is heated to 500° C. at a rate of 10° C. per minute in air. Obviously, these values can be greatly improved by the addition of fillers and other strengthening additives.

The new thermosetting compositions of this invention are useful as thermosetting binder resins for glass, carbon, asbestos, graphite, alumina, silicon carbide, boron nitride and boron fibers, and for particulate materials such as molybdenum sulfide and powdered fluorocarbon resins, and in the preparation of moldings to be used in high temperature environments, as for example, turbine blades for jet engines, aeroplane wing edges, ablative coatings for space reentry vehicles, bearings, grinding wheels, brake linings and clutch facings.

The carboxylated polymers of this invention also may be used in the form of solvent solutions thereof, such as those previously described in connection with the incorporation of a fluidizer in the thermosetting compositions of this invention. In that case the solutions contained, in addition to the specified solvents, the carboxylated polymer, the prepolymer from which it was derived and a fluidizer. However, other satisfactory solutions are those containing the carboxylated polymer alone or in combination with a fluidizer. All of these solutions are useful in the application of a primary coating to a metal or inorganic substrate, which coating, after being dried, is then itself coated with a composition containing a prepolymer of the type previously described herein. The latter composition may contain a fluidizer for the prepolymer. The resulting composite then is dried, if necessary, and ultimately subjected to a temperature in the range of about 100° to about 300° C. to effect curing of the thermosetting components thereof. The presence of the carboxylated polymer of this invention is the primary coating of the composite markedly improves the adhesion of the cured prepolymer to the metal or inorganic substrate.

The following examples will illustrate the preparation of the prepolymers, the carboxylated polymers, the thermosetting compositions and the thermoset resins of this invention. All parts and percentages are by weight unless otherwise indicated.

EXAMPLE 1

A glass-lined polymerization vessel was charged with 255 parts of distilled methyl isobutyl ketone as reaction solvent. The solvent was sparged with nitrogen, heated to reflux temperature, maintained at reflux for one and one-half hours and then cooled to room temperatue. To the cooled solvent was added four and one-half parts of p-xylene as an internal standard for analytical purposes. There next was added to the polymerization vessel a solution of 43.8 parts of m-diethynylbenzene dissolved in 43.8 parts of methyl isobutyl ketone, after which the contents of the vessel were heated to 85° C. To the reaction mixture there then was added over a period of approximately 15 minutes 46.5 parts of a solution of 0.25 part of nickel acetylacetonate and 0.50 part of triphenyl phosphine in 167 parts of methyl isobutyl ketone.

Following addition of the catalyst solution, the reaction mixture was fed with a solution of 35.8 parts of m-diethynylbenzene dissolved in 35.8 parts of methyl isobutyl ketone at a rate of 24.8 parts of solution per hour. Also, approximately 45 minutes after completion of the initial catalyst addition, the reaction mixture was charged with additional catalyst solution at the rate of about 8.8 parts per hour. The reaction was terminated when all of the m-diethynylbenzene monomer had been added to the reaction mixture and the ratio of the monomer to the p-xylene internal standard, as determined analytically, became the same as the ratio of the monomer to the internal standard at the beginning of the reaction.

Termination of the reaction was effected by interrupting the flow of catalyst solution and cooling the reaction mixture to 25° C. The polymer product was then recovered by precipitation from the reaction mixture with methanol, followed by filtration of the resulting slurry and washing of the collected solids twice with methanol. The resulting product had a number average molecular weight of 2490 and contained 10.1% by weight of terminal acetylenic groups.

EXAMPLE 2

A glass reaction vessel equipped with a stirrer was charged with a solution of 100 parts of the polymer product of Example 1 dissolved in 3000 parts of tetrahydrofuran. To the stirred solution was added 65 parts of aqueous 6.5% potassium permanganate and stirring was continued for four hours while maintaining the temperature of the reaction mixture in the range of 20°–30°° C. Excess permanganate in the reaction mixture was then reduced by the addition of acidified sodium sulfite solution, after which the reaction mixture was filtered to remove the suspended manganese dioxide. The oxidized polymer was precipitated by addition of the filtrate to four times its volume of aqueous 90% methanol with stirring. The precipitated yellow solids were collected by filtration, washed with methanol and water, and dried at room temperature under vacuum. The yield of product was 98%. Analysis showed that the oxidized polymer had a number average molecular weight of 3390 and contained 0.46% by weight of carboxyl groups. It was soluble in pyridine and acetone.

EXAMPLE 3

The procedure of Example 2 was duplicated except to use larger amounts of the aqueous permanganate solution. The results obtained are tabulated below:

| KMnO$_4$ Solution (parts) | Product Yield (%) | Molecular Weight (number average) | Carboxyl Groups (% by weight) |
|---|---|---|---|
| 130 | 98 | 3160 | 0.97 |
| 260 | 97.9 | 3170 | 1.64 |
| 520 | 99 | 2860 | 2.91 |
| 780 | 99.8 | 2870 | 3.68 |

EXAMPLE 4

A solution containing 133.5 parts of thallic nitrate, 150 parts of water and 250 parts of 70% perchloric acid was prepared. Seventeen parts of this solution was slowly added to a glass reaction vessel containing a stirred solution of 100 parts of arylacetylene polymer dissolved in 1250 parts of diethylene glycol dimethyl ether. The arylacetylene polymer was prepared as in Example 1 using a 90:10 mixture of m-diethynylbenzene and p-diethynylbenzene.

The reaction mixture was filtered to remove a small amount of solids and to the stirred filtrate was added 150 parts of 2N potassium iodide solution to remove the excess thallium salt. The resulting slurry was filtered to remove the inorganic salts, and the filtrate was added to 3200 parts of methanol with stirring. The yellow solids which precipitated was separated by filtration, washed successively with methanol, water, concentrated hydrochloric acid, hot water and methanol, and dried under vacuum. The oxidized polymer, obtained in 95% yield, was soluble in pyridine and chloroform and containing 2.5% by weight of carboxyl groups.

EXAMPLE 5

Thermosetting compositions were prepared from the arylacetylene polymer described in the first paragraph of Example 4. One such composition was prepared from 320 parts of the polymer and 80 parts of 1,4-diphenylbutadiyne as fluidizer by dissolving the polymer and fluidizer in tetrahydrofuran, with thorough mixing, following which the tetrahydrofuran solvent was removed by evaporation using a rotary evaporator. The composition then was ground, dried overnight at room temperature and finally dried for 1 hour at 55° C. at 5 mm. pressure. The resulting composition contained 80% polymer and 20% fluidizer. A similar composition containing 70% polymer and 30% fluidizer was prepared in the same manner from 280 parts of the polymer and 120 parts of 1,4-diphenylbutadiyne.

Ninety-five parts of the 80% polymer-20% fluidizer composition was blended with five parts of the oxidized polymer (0.46% carboxyl groups) of Example 2 using sufficient methyl ethyl ketone as the solvent to provide a solution containing 60% by weight of solids. Two other solutions were prepared in the same manner using, in the one case, five parts of the oxidized polymer of Example 3 containing 0.97% carboxyl groups and, in the other case, five parts of the oxidized polymer of Example 3 containing 1.64% carboxyl groups. A solution containing only the 80% polymer-20% fluidizer composition, in the amount of 100 parts, also was prepared. Identical solutions then were prepared using the 70% polymer-30% fluidizer composition in place of the 80–20 composition.

Each of the above solutions was applied in the form of a 30-mil thick layer onto the last half inch of two aluminum (6061 T4) strips 1 inch in width and 4 inches in length. These strips had previously been degreased in trichloroethylene vapor, etched in chromic acid, washed with distilled water and dried. After evaporation of the solvent from the coated areas of the strips, the strips were joined by overlapping them at the coated areas, applying 50 to 100 p.s.i. pressure at the point of overlap and heating the assembly to 135° C. The bonded strips were then heated for two and one-half hours at 210° C. to cure the layer of composition acting to bond the strips to each other. The bonded specimens were then tested in tension according to the method of ASTM D 1002. The lap shear strengths provided by the various compositions are shown in the following table:

| | | Lap Shear Strength (lbs./inch) | Specimen Failure Mode |
|---|---|---|---|
| 1. | Polymer-fluidizer (80–20) | nil | Adhesive |
| 2. | Polymer-fluidizer (80–20) and oxidized polymer (0.46% carboxyl) | 200 | Cohesive |
| 3. | Polymer-fluidizer (80–20) and oxidized polymer (0.97% carboxyl) | 170 | Cohesive |
| 4. | Polymer-fluidizer (80–20) and oxidized polymer (1.64% carboxyl) | 191 | Cohesive |
| 5. | Polymer-fluidizer (70–30) | nil | Adhesive |
| 6. | Polymer-fluidizer (70–30) and oxidized polymer (0.46% carboxyl) | 168 | Cohesive |
| 7. | Polymer-fluidizer (70–30) and oxidized polymer (0.97% carboxyl) | 192 | Cohesive |
| 8. | Polymer-fluidizer (70–30) and oxidized polymer (1.64% carboxyl) | 220 | Cohesive |

EXAMPLE 6

The procedure of Example 5 was modified by preparing 10% by weight solutions in methyl ethyl ketone of the oxidized polymers used in that example, immersing the aluminum strips in these solutions to thoroughly coat the strips, drying the coated strips at room temperature and then proceeding to treat the coated strips, as in Example 5, using 60% by weight solutions in methyl ethyl ketone of the 80% polymer-20% fluidizer and 70% polymer-30% fluidizer compositions. The lap shear strengths exhibited by the resulting composites are as follows:

|    |                                                        | Lap Shear Strength (lbs./inch) |
|----|--------------------------------------------------------|--------------------------------|
| 1. | Oxidized polymer (0.46% carboxyl) and polymer-fluidizer (80–20) | 210 |
| 2. | Oxidized polymer (0.97% carboxyl) and polymer-fluidizer (80–20) | 150 |
| 3. | Oxidized polymer (1.64% carboxyl) and polymer-fluidizer (80–20) | 220 |
| 4. | Oxidized polymer (0.46% carboxyl) and polymer-fluidizer (70–30) | 214 |
| 5. | Oxidized polymer (0.97% carboxyl) and polymer-fluidizer (70–30) | 267 |
| 6. | Oxidized polymer (1.64% carboxyl) and polymer-fluidizer (70–30) | 153 |

EXAMPLE 7

A formulation containing 45 parts of the 80% polymer-20% fluidizer composition of Example 5, five parts of the oxidized polymer (0.46% carboxyl) of Example 2 and 50 parts of silicon carbide (180 mesh) was molded into a disk which was four inches in diameter and approximately one-fourth of an inch thick. A comparable disk was prepared from 50 parts of the 80% polymer-20% fluidizer composition and 50 parts of silicon carbide. The disks were cured by heating them at atmospheric pressure over a period of about 24 hours to a final temperature of 200° C.

The cured disks were conditioned at 72° ± 2° F. and 50 ± 2% relative humidity and then subjected to a standard abrasion test (Taber abrasion, ASTM D 1044) using a CS-22 wheel 1000-gram load. After 2000 revolutions, the disks containing the oxidized polymer component showed a loss in weight of 0.0275 ram. The loss in weight for the disk containing none of the oxidized polymer was 0.0915 gram after 2000 revolutions. These data show the improved weight retention contributed by the formulation containing the oxidized polymer.

What I claim and desire to protect by Letters Patent is:

1. A thermosetting composition comprising a blend of a prepolymer (A) of at least one polyacetylenically substituted aromatic compound and from about 2 to about 25% by weight of a carboxylated prepolymer (B) obtained by oxidation of said prepolymer (A), both of said prepolymers (A) and (B) having a number average molecular weight of from about 900 to about 12,000, a ratio of aromatic protons to olefinic protons greater than about 2.4 and from about 5 to about 20% by weight of terminal acetylenic groups attached to the aromatic rings of said prepolymers, and said prepolymer (B) additionally having from about 0.1 to about 5% by weight of carboxyl groups attached to the aromatic rings of said prepolymer.

2. The composition of claim 1 wherein the prepolymer comprises a polymer of a diethynylbenzene.

3. The composition of claim 2 wherein the polymer of a diethynylbenzene is a copolymer of a diethynylbenzene and phenylacetylene.

4. A thermoset resin obtained by heat curing the composition of claim 1.

* * * * *